(12) United States Patent
Ohno et al.

(10) Patent No.: US 8,454,220 B2
(45) Date of Patent: Jun. 4, 2013

(54) ILLUMINATOR WITH LIGHT SOURCE UNITS RADIALLY ARRANGED AT A REFERENCE POINT OF A BASE FRAME

(75) Inventors: Yasuo Ohno, Kitasaku-gun (JP); Kaori Fujii, Kitasaku-gun (JP); Masahisa Nishio, Kitasaku-gun (JP)

(73) Assignee: Minebea Co., Ltd, Nagano (JP)

( * ) Notice: Subject to any disclaimer, the term of this patent is extended or adjusted under 35 U.S.C. 154(b) by 0 days.

(21) Appl. No.: 13/351,686

(22) Filed: Jan. 17, 2012

(65) Prior Publication Data
US 2012/0243260 A1 Sep. 27, 2012

(30) Foreign Application Priority Data
Mar. 22, 2011 (JP) ................................. 2011-062809

(51) Int. Cl.
*F21V 21/00* (2006.01)
*F21V 7/04* (2006.01)

(52) U.S. Cl.
USPC ...... 362/613; 362/616; 362/628; 362/249.06; 362/612

(58) Field of Classification Search
USPC ............. 362/26, 27, 612, 613, 615, 616, 628, 362/632–634, 555, 237, 240, 249.01, 249.02, 362/249.06, 249.14
See application file for complete search history.

(56) References Cited

U.S. PATENT DOCUMENTS
6,220,733 B1 * 4/2001 Gordon .......................... 362/500
6,530,683 B1 * 3/2003 Ohkohdo et al. .............. 362/511
6,955,459 B2 * 10/2005 Mochizuki et al. ............ 362/602

FOREIGN PATENT DOCUMENTS
JP A-10-21717 1/1998
WO WO 2007/023891 A1 3/2007

* cited by examiner

*Primary Examiner* — Thomas Sember
(74) *Attorney, Agent, or Firm* — Oliff & Berridge, PLC

(57) ABSTRACT

There is provided an illuminator comprising a plurality of light source units that include: a light guide plate; and a plurality of point light sources arranged on a lateral side of the light guide plate, each of the light source units being configured as that light introduced from the plurality of point light sources to the light guide plate is adapted to exit from a main surface of the light guide plate, wherein the plurality of light source units are radially positioned at a reference point of the base frame.

8 Claims, 8 Drawing Sheets

ILLUMINATOR WITH LIGHT SOURCE UNITS RADIALLY ARRANGED AT A REFERENCE POINT OF A BASE FRAME

BACKGROUND OF THE INVENTION

1. Field of the Invention

The present invention relates to an illuminator, more particularly to an illuminator being composed of a plurality of light source units that are radially arranged at a reference point of a base frame so as to improve luminosity of the illuminator.

2. Description of the Related Art

As light sources applied to a general lighting such as an indoor lighting, an incandescent lamp or a fluorescent lamp has been used so far; however, through the technical advancement of today's blue light-emitting diodes (the LEDs), the LEDs have come into use for light sources applied to, for example, ceiling lights or downlights. See Japanese Patent Application No. H10-21717 and WO 2007/023891.

Figure 8A:
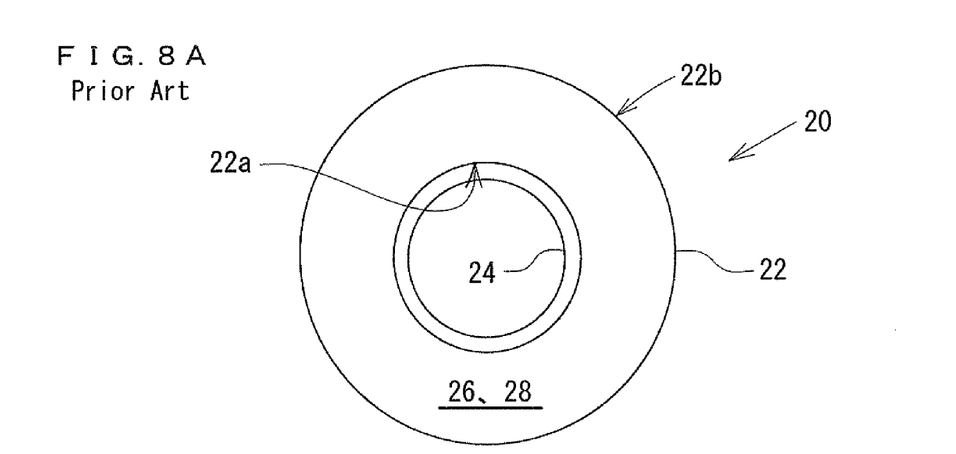
FIG. 8A is a plan view.
Figure 8B:
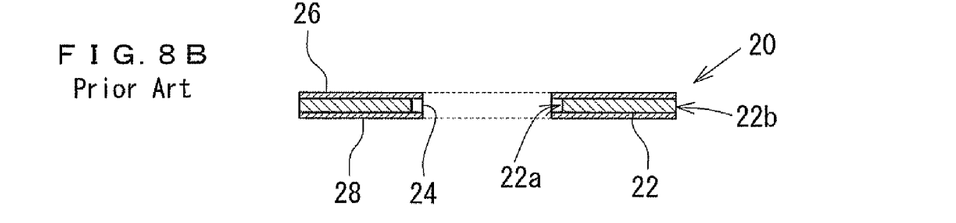
FIG. 8B is a sectional view.
Figure 9:
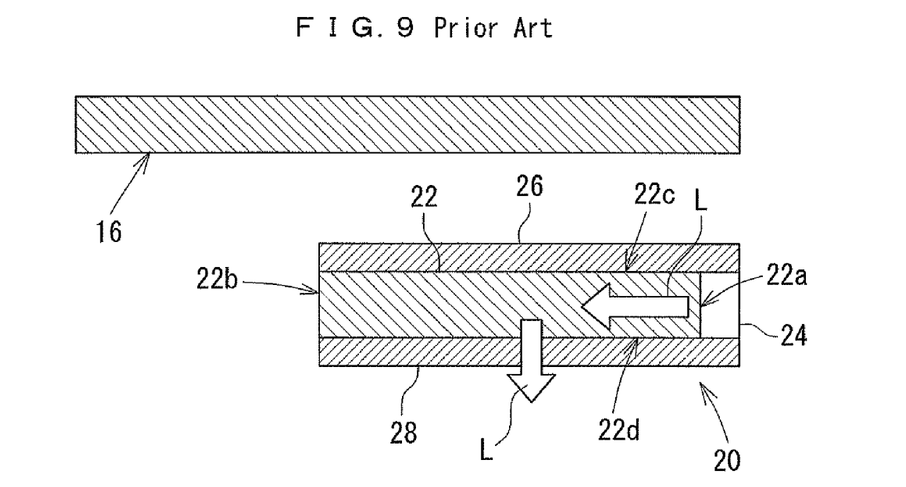
FIG. 9 is a sectional view that schematically illustrates that lights that have been introduced from the point light source of FIG. 8B to the light guide plate are adapted to exit from the main surface of the light guide plate.

As one of the examples, an illuminator 20 as shown in FIGS. 8 and 9 is mounted on an indoor ceiling, and is composed of: a circular light guide plate 22 including a circular inside end face 22a and a circular outside end face 22b; and a plurality of point light sources 24. The plurality of point light sources 24 are arranged along the inside end face 22a of the light guide plate 22. The light guide plate 22 is made of a transparent resin material such as polycarbonate resin, and is fabricated to have a certain thickness. An upper surface 22c (on the side of a ceiling surface 16) has, for example, dot patterns (not shown) working as a means to change the optical path of lights in which to be propagated in the light guide plate 22. Here, in FIG. 8A, the point light sources 24 are illustrated by a circular-band configuration; however, this actually means that the plurality of the point light sources are circularly arranged.

As shown in FIG. 9, a reflection plate 26 is arranged on the upper surface 22c of the light guide plate 22. A lower surface 22d (on the side of a floor surface) is a main surface formed as that the most parts of the light exit while incidence lights L have been propagating in the light guide plate 22. Further, a diffusion plate 28 is mounted on the lower surface 22d. Here, although the incidence lights L themselves exit with a certain angle width relative to a direction that orthogonally crosses the main surface 22d, with the optical diffusion effects provided by the diffusion plate 28, the incidence lights L are diffused further wide. The reflection plate 26 and the diffusion plate 28 are both circularly formed thereby being able to cover the light guide plate 22 and the point light source 24. In addition, the reflection plate 26 is normally either a diffuse-reflection material or a direct reflection material made of, for example, a white film or an evaporated silver film. On the other hand, any other materials may replace the diffusion plate 28 as long as the materials possess functions to diffuse the incidence lights L that exit from the lower surface 22d. Any types of a prism sheet may thus optionally replace the diffusion plate 28. Here, in the above illuminator, the plurality of point light sources 24 may be arranged along the outside end face 22b of the light guide plate 22.

Here, considering an illuminator using LEDs as a light source, since the luminous efficiency of the LEDs still needs further development, it is yet prerequisite to have a plurality of point light sources in order to satisfy properties (including luminosity) identical with conventional light sources such as a fluorescent lighting. In actual situations of the above conventional arts, the plurality of point light sources 24 are arranged along the inside end face 22a or the outside end face 22b of the light guide plate 22. However, due to the size of each LED or mounting pitches between each of the LEDs, the numbers of mountable LEDs should be determined based on the overall length of the inside end face 22a or the outside end face 22b.

SUMMARY OF THE INVENTION

The present invention has been made in light of the above problem, and it is an object of the present invention to provide an illuminator that is achievable with further improvement of the luminosity of the illuminator on which a plurality of point light sources are mounted.

Embodiments according to the present invention hereinbelow exemplify some structures of the present invention, and are itemized for facilitating understanding of various structures of the present invention. Note that each item does not intend to limit the technical scope of the present invention. While considering the best modes to carry out the present invention, even if components of each item are partially substituted or deleted, or even if another component is added thereto, these should be regarded as the elements of the technical scope of the present invention.

In order to achieve the object described above, according to a first aspect of the present invention, there is provided an illuminator comprising a plurality of light source units that include: a light guide plate; and a plurality of point light sources arranged on a lateral side of the light guide plate, each of the light source units being configured as that light introduced from the plurality of point light sources to the light guide plate is adapted to exit from a main surface of the light guide plate, wherein the plurality of light source units are radially positioned at a reference point of the base frame.

With this structure, each of the plurality of light source units is positioned by means of the base frame whereby this constitutes that the plurality of light sources are arranged on each of the lateral sides of the light guide plate. By providing the plurality of light source units, the numbers of the point light sources are consequently made increased in the illuminator as a whole.

Further, since the light guide plate of each of the light source units has been divided into some pieces thereby contributing to downsizing, the light guide plate can be easily made. Still further, considering the other optical parts such as the reflection plate etc. that have been optionally used together with the light source unit, they are also divided into some pieces as the same with the light guide plate. Accordingly, in general methods of cutting out certain shapes from a large-sized sheet, the sheet can be consumed with least waste being possible to keep a high yield. Moreover, when some failures occur, only the light source unit with failure needs to be exchanged for recovery of necessary luminosity.

In addition, with the above structure, the plurality of light source units may be radially arranged at the reference point of the base frame. In this case, since the plurality of light source units are radially positioned at the reference point of the base frame, it makes possible that the luminous range of lights is allowed to radially spread at the reference point of the base frame.

In the first aspect of the present invention, the light guide plate of each of the plurality of light source units is configured as that an external side thereof positioned farthest in a radius direction from the reference point of the base frame is made to have a wider width than an internal side thereof facing the reference point of the base frame.

With this structure, since the light guide plate of each of the plurality of light source units is configured as that the width of the external side of the light guide plate positioned farthest in a radius direction from the reference point of the base frame is made wider (in a plan view) than the width of the internal side of the light guide plate facing the reference point of the base frame, a space between each of the light source units that are radially arranged at the reference point of the base frame will not widen even if moving away from the reference point of the base frame. Accordingly, a mute area, the area not contributing to illuminance of the point light sources, can be prevented so as to even the amount of lights emitted from the main surface of the light guide plate.

In the first aspect of the present invention, a space defined between each of the lateral sides of the light guide plates of the light source units next to each other is made constant from the internal side of the light guide plate facing the reference point of the base frame to the external side of the light guide plate positioned farthest in a radius direction from the reference point of the base frame.

With this structure, the space defined between each of the lateral sides of the light guide plates of the light source units next to each other, the light guide plates being radially arranged at the reference point of the base frame, is made constant regardless of distance from the reference point of the base frame. As the same, the mute area can be prevented so as to even the amount of lights emitted from the main surface of the light guide plate.

In the first aspect of the present invention, the base frame has a circular configuration in a plan view, a center of which is the reference point.

With this structure, the illuminator has the base frame, which is circular in a plan view. And, the center of the base frame is referred to as the reference point. Since each of the light source units is radially positioned at the reference point of the base frame, it makes possible that the illumination range of lights radially spreads at the reference point of the base frame.

In the first aspect of the present invention, the point light sources of each of the light source units are arranged along each of lug portions that is radially placed on the base frame.

With this structure, since the plurality of point light sources of each of the light source units are arranged along each of the lug portions that is radially formed on the base frame, heat to be generated from the point light sources can be released through the lug portions on the base frame.

In the first aspect of the present invention, each of the lug portions is shaped to have a wall configuration, and the plurality of point light sources of the light source units are arranged on each side surface of the lug portions, the side surface being faced to each of the lateral sides of the light guide plate.

With this structure, since the plurality of point light sources of the light source units are arranged on each side surface of the wall-shaped lug portions, the side surface being faced to each of the lateral sides of the light guide plate of the light source units, it makes possible that a space defined between the point light sources and light source units is minimized. Accordingly, the mute area can be minimized as much as possible so as to even the illuminance of the illuminator.

In the first aspect of the present invention, a frame member is arranged so as to cover between each of the lateral sides of the light guide plates of the light source units next to each other, the frame member projecting in a direction that light exits from the main surface of the light guide plate so as to form a projected surface; and the projected surface of the frame member includes a pair of inclined surfaces that taper as moving away from the main surface of the light guide plate in a direction light exits.

With this structure, since the frame member with the projected surface covers between each of the lateral sides of the light guide plates next to each other, the mute area can be covered as the same with the above. Further, since the projected surface of the frame member includes the pair of inclined surfaces tapering as moving away from the main surface of the light guide plate in a direction lights exit, lights emitted from the main surface of the light guide plate are adapted to reflect by the pair of inclined surfaces. Accordingly, the frame member can be passively illuminated so as to even the illuminance of the illuminator.

In the first aspect of the present invention, an interval between each individual point light source in the plurality of point light sources is adapted to shorten as moving from each of the internal sides of the light guide plates facing the reference point of the base frame to each of the external sides of the light guide plates positioned farthest in a radius direction from the reference point of the base frame.

With this structure, each of the light source units are radially positioned at the reference point of the base frame, and the irradiated range of lights is able to further spread as moving away from the reference point of the base frame. Accordingly, by shortening the interval between each individual point light source in the plurality of the point light sources, making each individual point light source arranged densely, the illuminance of the illuminator can be made even. Since the present invention has been established as explained hereinabove, it makes possible that the illuminator provided with the light point sources can obtain further high brightness.

BRIEF DESCRIPTION OF THE DRAWINGS

FIG. 1 is the single view drawing of an illuminator according to the first embodiment of the present invention where

FIG. 6 is the single view drawing of an illuminator according to the second embodiment of the present invention where

FIG. 8 is a schematic view illustrating the light guide plate and the point light source of a conventional illuminator where

DETAILED DESCRIPTION OF THE PREFERRED EMBODIMENTS

Preferred embodiments of the present invention will be described with reference to the accompanying drawings. Here, portions identical with or correspondent to conventional arts are indicated by the same references without providing detail explanations thereof.

Figure 1A:
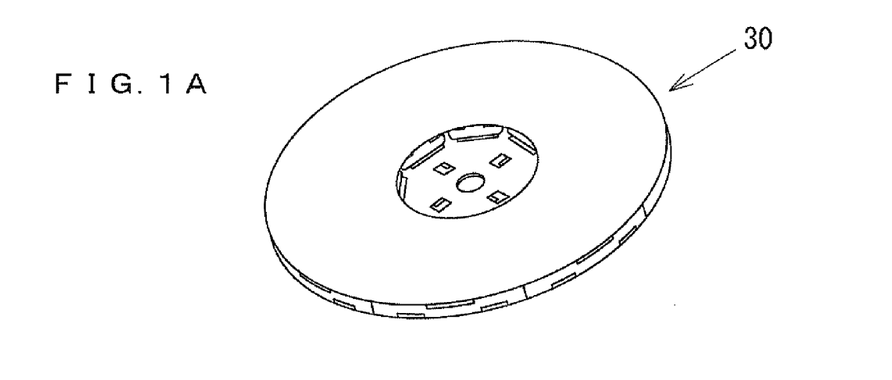
FIG. 1A is an outline view.
Figure 1B:
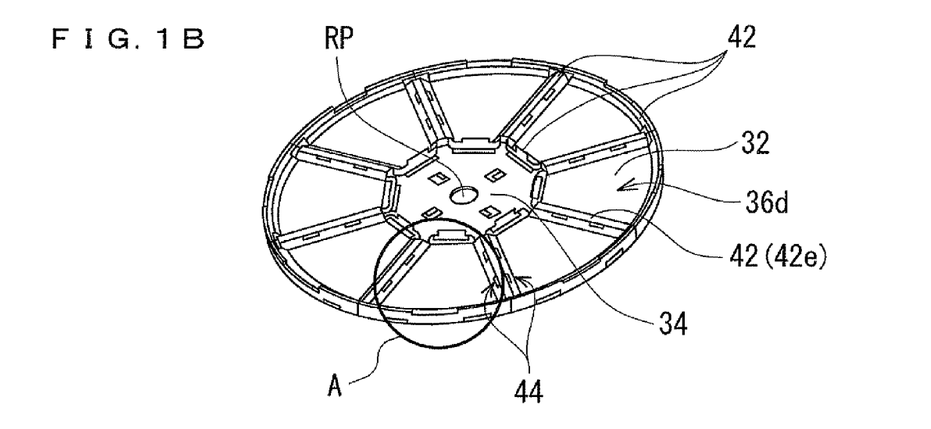
FIG. 1B is a view where a white plate of FIG. 1A is removed.
Figure 1C:
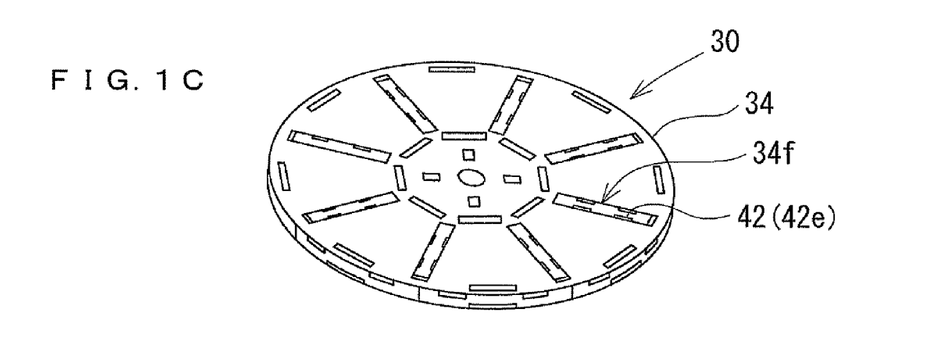
FIG. 1C is a back-sided outline view.

To begin with, the first embodiment of the present invention will be mainly explained with reference to FIGS. 1 to 3. An illuminator 30 according to the first embodiment of the present invention has a thin disc-like appearance as a whole as illustrated in FIG. 1A. Further, a plurality of light source units 32 (8 sets in FIG. 1B) are radially arranged at the reference point (hereinafter referred to as the "RP" as shown in FIG. 1B) of a base frame 34, which has a circular configuration in a plan view.

Figure 2:
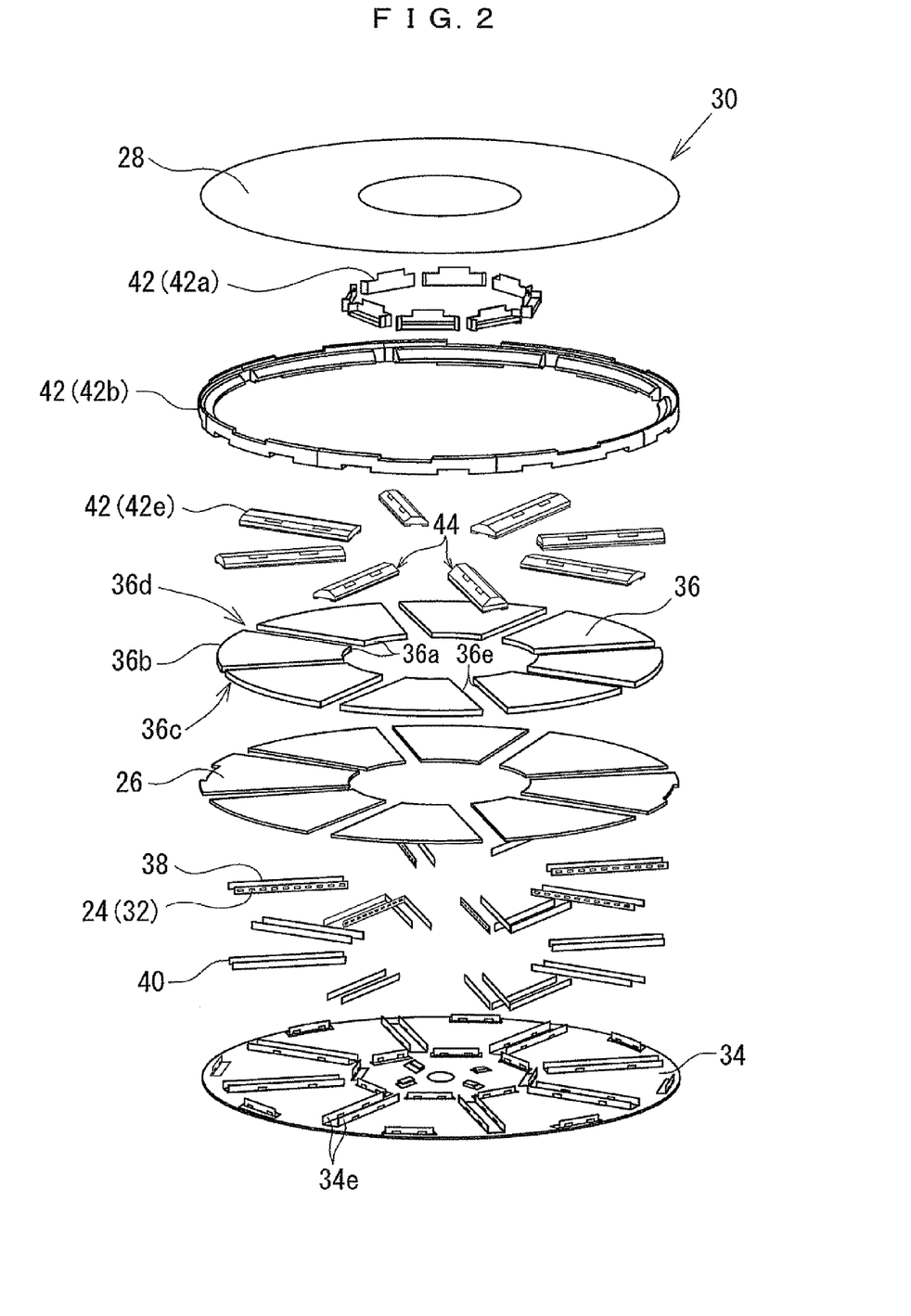
FIG. 2 is the exploded view of the illuminator illustrated in FIG. 1 where each of the composition parts thereof is shown.
Figure 3:
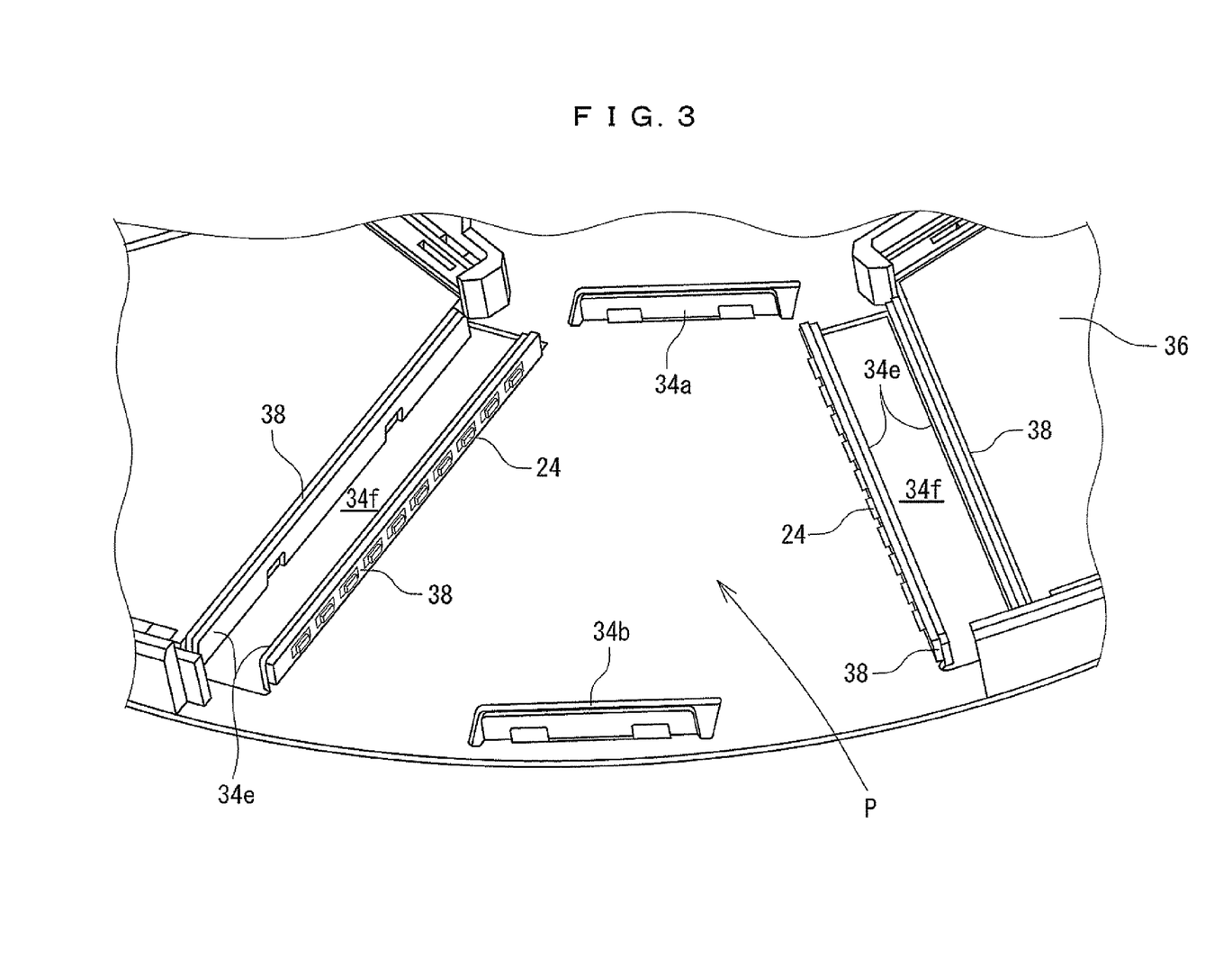
FIG. 3 is an enlarged view illustrating the main portion of FIG. 1B where a light guide plate, a housing frame and a reflection plate are removed from an area which is defined by A in FIG. 1B.

As shown in FIG. 2, the light source unit 32 is composed of a light guide plate 36; and a plurality of point light sources 24 arranged at lateral sides of the light guide plate 36. Lights that have been introduced from the point light sources 24 to the light guide plate 36 are adapted to exit from a main surface 36d of the light guide plate 36. Further, the light guide plate 36 according to this embodiment is configured as that its external side 36b positioned farthest in a radius direction from the RP of the base frame has width wider in a plan view than the one of an internal side 36a facing the RP of the base frame. Still further, each of the light guide plates 36 has a fan configuration, and an interval between each lateral side 36e of the light guide plates 36 of the light source units 32 next to each other is made constant from the internal side 36a to the external side 36b.

In formation of the light guide plate 36, a transparent resin material such as polycarbonate resin is configured to have a certain thickness. As the same with the conventional art (see FIG. 9), on a reflective surface 36c (that is, a surface facing a ceiling), dot patterns (not shown) as a means to change the optical path of lights spreading in the light guide plate 36 may be formed.

The plurality of point light sources 24 of the light source unit are arranged along each of the lateral sides 36e, each of the lateral sides 36e facing each of the light source units. In this embodiment, an LED being composed of the point light sources 24 is mounted on a circuit board (FPC) 38. This circuit board 38 is arranged along a lug portion (see a reference 34e in FIG. 3) that is radially formed on the base frame 34. The circuit board 38 is then fixed to the lug portion 34e by means of a double-sided tape 40. The light guide plate 36 is mounted at each of fan-shaped areas on the base frame 34 defined between the circuit boards 38 (see an area P in FIG. 3). When each of the light guide plates 36 is fitted into the area P on the base frame 34, the reflection plate 26 identically formed with the light guide plate 36 in a plan view (that is, the fan configuration) is placed between the light guide plate 36 and the base frame 34.

Figure 4:
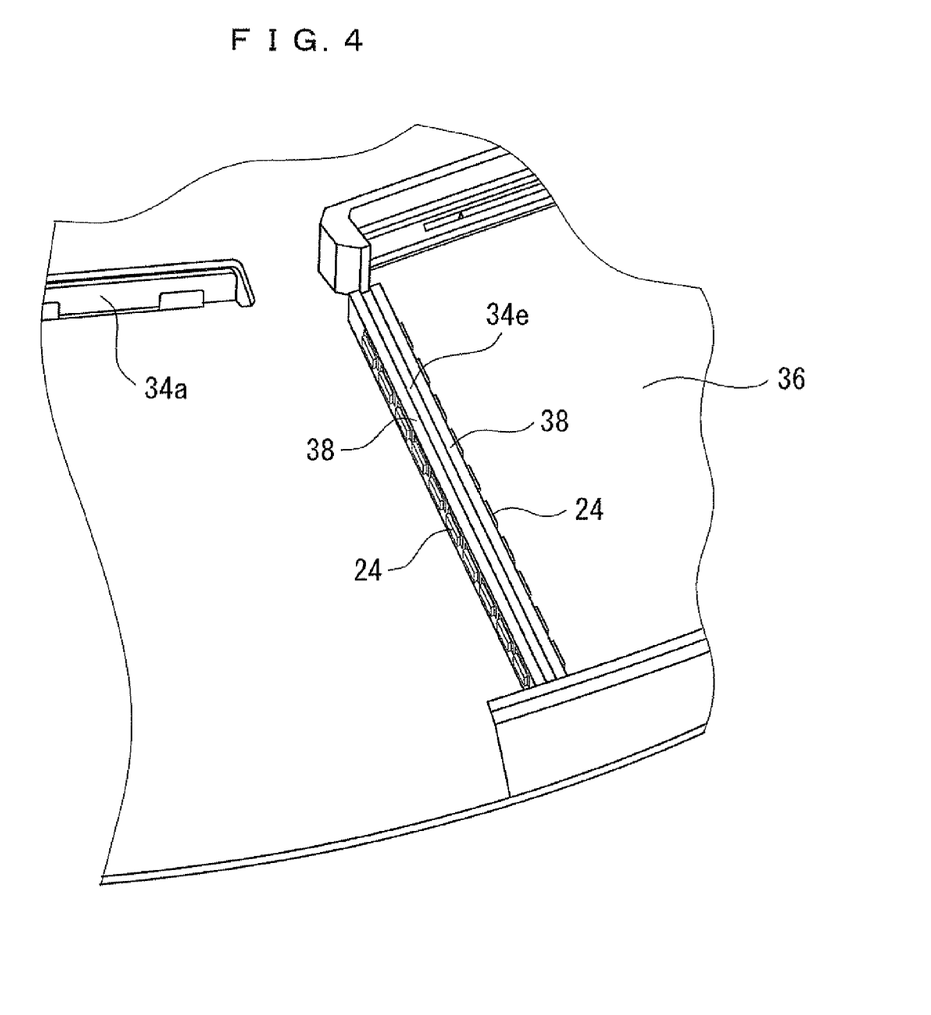
FIG. 4 is an enlarged view illustrating a case that a circuit board on which point light sources are mounted are fixed to both side surfaces of a lug portion.
Figure 5:
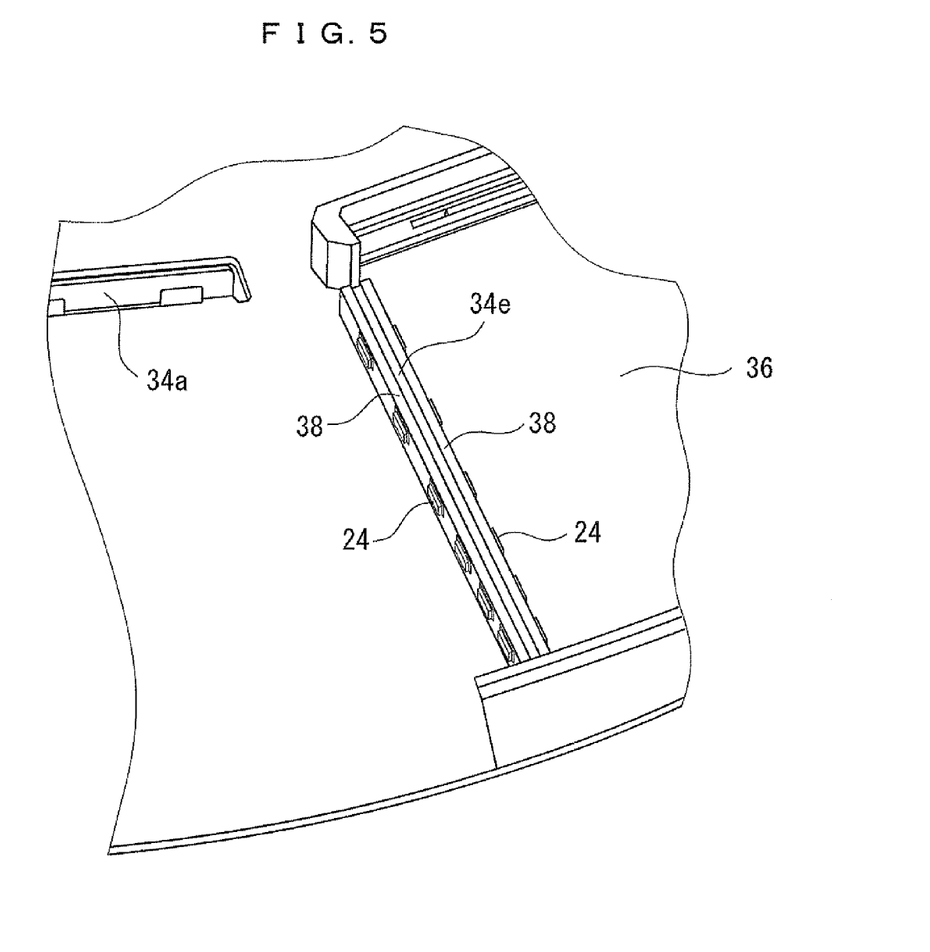
FIG. 5 is an enlarged view illustrating a case that a mounting interval between each individual point light source is made shorter and dense as moving away from an internal side of the light guide plate in a radial direction.

In the example of FIG. 2, the base frame 34 is made of aluminum alloy, stainless alloy, etc. Each of the lug portions 34e has a wall configuration. The numbers of the lug portions 34e are the same with the one of the circuit boards 38 (that is, twice of the numbers of the light guide plates 36). The circuit board 38 is fixed to the side surface of each of the lug portions 34e (that is, the outer surface facing the light guide plate 36). This embodiment is however not limited thereto, but the numbers of the lug portions 34e may be the same with the ones of the light guide plates 36. In this case, the circuit board 38 of each of the light source units 32 is fixed to the both side surfaces of the lug portion 34e (see FIG. 4). In FIG. 2, an interval between each individual point light source of the plurality of point light sources 24 mounted on the circuit board 38 is constant. However, this can be optionally arranged as that the interval between each individual point light source can make shortened as moving from the internal side 36a to the external side 36b of the light guide plate 36 (see FIG. 5).

Each frame member 42 is arranged so as to cover the lateral sides 36e of the light guide plates 36 next to each other (that is, a portion on which the plurality of point light sources 24 are mounted). See the reference 42e in FIG. 1B, FIG. 1C and FIG. 2. Each of the frame members 42 has a pair of inclined surfaces 44, 44 that tapers as moving away from the main surface 36d of the light guide plate 36 (that is, in a direction where lights exit from the main surface 36d of the light guide plate 36). These inclined surfaces 44, 44 constitute reflective surfaces that are passively illuminated by which lights emitted from the main surface 36d of the light guide plate 36 are reflected. Here, in order to improve reflective properties, it would be preferable that the frame member 42e is made of resin mixed with light diffusion particles. Or light diffusion coating materials may be preferably applied on the surface of the frame members 42e.

In the above FIGS, each of the inclined surfaces 44 has a constant inclined degree; however, the other configurations may be applicable. For example, inclined angles may vary according to distance from the RP of the base frame 34. Or, the inclined angles may vary as moving apart from the main surface 36d of the light guide plate 36. Further, each of the inclined surfaces 44 may be all formed with a rounded surface. In any cases, it is desirable to apply surface configurations that can obtain necessary reflective properties.

The frame members 42e projects in a direction where lights exit from the main surface 36d of the light guide plate 36, and is fitted into an opening portion 34f formed with the lug portions 34e on the base frame 34. Accordingly, the light guide plate 36 can be fixed to the base frame 34. Here, in addition to the lug portions 34e, a lug portion 34a is formed at each of the internal sides 36a facing to the RP of the base frame 34, and a lug portion 34b is formed at each of the external sides 36b positioned farthest in a radius direction from the RP of the base frame 34. See FIG. 3. The light guide plate 36 is also positioned to the base frame 34 along with the lug portions 34a and 34b. As the same with the frame member 42e, frame members 42a, 42b are each fitted into the opening portions of the lug portions 34a, 34b. See FIG. 2. With the frame members 42a, 42b, the light guide plate 36 is fixed also to the base frame 34.

The diffusion plate 28 (exemplified as an acryl white board in FIG. 2), which is circular in a plan view, covers the main surface 36d of the light guide plate 36 of each of the light source units 32. The illuminator will be then completed.

Next, with the embodiments of the present invention as discussed hereinabove, the following operational effects are obtainable. Considering the illuminator 30 according to the first embodiment of the present invention, the plurality of point light sources 24 are arranged on the lateral sides 36e of the light guide plate 36 of each of the light source units 32. By thus providing these light source units 32, the illuminator 30 can, as a whole, obtain increased numbers of the point light sources 24. Thus, brightness equal to or more of conventional fluorescent lamps becomes obtainable.

Since the light guide plate 36 of each of the light source units 32 is formed by a divided piece, the light guide plate 36 can be down-sized relative to the entire body of the illuminator 30. The light guide plate 36 can be manufactured much easier. Further, the optical parts such as the reflective plates 26, etc. that are properly used together with the light source unit 32 are also divided into some pieces as the same with the light guide plate 36. Based on the above, when applying a general method of cutting out a necessary shape from a large sheet, the sheet can be well handled, thereby making yield rates improved. Moreover, when troubles occur, users may exchange only the light source unit 32 being subjected to defects to recover desired brightness.

Besides the above, since the base frame 34 is formed to have a circular configuration in a plan view, and each of the light source units 32 is positioned radially relative to the RP of the base frame 34, the illuminated range of lights is allowed to radially spread at the RP of the base frame 34.

In each of the light guide plates 36 of the light source unit 32, the external side 36b thereof is adapted to have a width wider than the internal side 36a thereof. More specifically, each of the light guide plates 36 is formed to have a fan configuration in a plan view. Further, the space between each of the light source units 32 that are radially arranged at the RP on the base frame 34 is set to be constant regardless of distance from the RP of the base frame 34. In other words, this space does not widen regardless of distance from the RP of the base frame 34 (even at the farthest point from the RP). Lights emitted from the main surface 36d of the light guide plate 36 can be thus made even.

Here, however, in the light guide plate 36, which is formed into the fan shape in a plan view, the space between each of the light source units 32 that are radially arranged at the RP of the base frame 34 does not need to be constant regardless of distance from the RP of the base frame 34. Further, each shape of the plurality of light source units 32 does not need to be all the same. As long as the certain numbers of the light source units 32 are radially mountable at the RP of the base frame 34, the illuminator 30 according to the present invention is manufacturable.

In addition, since the plurality of point light sources 24 of each of the light source units 32 are arranged along the lug portions 34e that are radially formed on the base frame 34, it would be possible to effectively release generated heat from the point light sources 24 to the outside of the illuminator 30 through the base frame. Here, each of the lug portions 34e has a flat surface to which the point light sources 24 (the circuit board 38) is fixable. However, as long as the lug portions 34e have a configuration contributing to heat dissipation, the lug portions 34e do not need to have the wall configuration as shown in, for example, FIG. 2. The lug portions 34e may be a sectional L-shape, or projections each connected like forming mountain ridges.

Further, by arranging the plurality of point light sources 24 of the light source units 32 on both sides of the wall-shaped lug portions 34e of the base frame 34 (see FIG. 4), it can minimize the space between each of the light source units 32 next to each other. Accordingly, the mute area not contributing to illuminance of the point light sources can be reduced as much as possible so as to further even the illuminance of the illuminator 30.

Still further, according to the embodiments of the present invention, the frame member 42e is configured as to project in a direction where lights exit from the main surface 34d of the light guide plate 36. The frame member 42e covers the lateral sides 36e, 36e of the light source units 32 next to each other. Accordingly, it makes possible to cover the mute area not contributing to illuminance of the point light sources 24. Here, inclined surfaces 44, 44 may be defined as a pair of side surfaces formed as that the side surfaces taper in a direction where lights exits from the main surface 36d of the light guide plate 36. With this configuration, lights emitted from the main surface 36d of the light guide plate 36 are reflected by these inclined surfaces 44 so as to make the frame member 42e passively illuminated, which contributes to further even the illuminance of the illuminator 30.

In addition, the range of the illuminance of lights will widen as moving away from the RP of the base frame 34 in a radial direction (that is, toward the external sides 36b). Here, by making a mounting interval between each individual point light source in the plurality of point light sources 24 to be shorter and dense as moving from the internal sides 36a to the external sides 36b, the illuminance of the illuminator 30 can be further even.

In the first embodiment of the present invention, the base frame 34 is formed to have a circular configuration in a plan view. The center of the base frame 34 is set to be the reference point (the "RP") at which the plurality of the light source units 32 are radially arranged. Accordingly, as shown in FIG. 1A, the illuminator 30 has, as a whole, a thin circular appearance. The present invention is, however, not limited thereto. The base frame 34 may instead have, for example, a polygonal configuration. Regardless of any shape to which the base frame 34 is applied, the illuminator 30 can of course employ the same structure as discussed hereinabove.

Figure 6A:
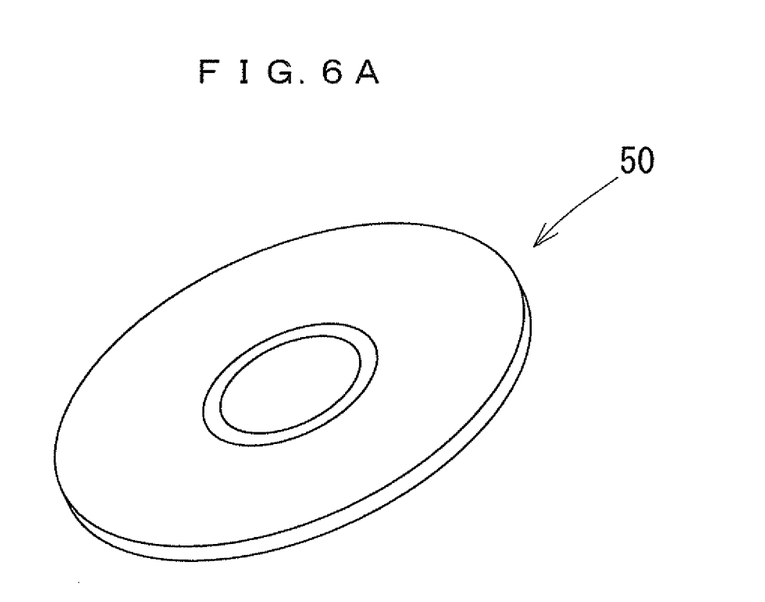
FIG. 6A is an outline view.

Next, with reference to FIGS. 6 and 7, the second embodiment of the present invention will be discussed hereinbelow. Here, portions identical with or corresponding to the prior arts or the first embodiment of the present invention have the same reference numerals, and detail explanations thereof will be omitted.

Figure 6B:
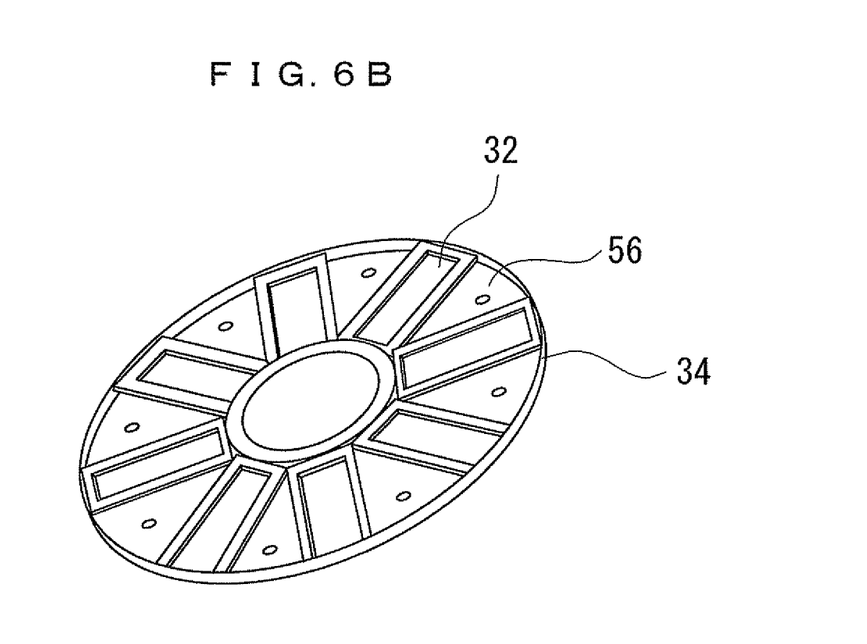
FIG. 6B is a view where a white board illustrated in FIG. 6A is removed.
Figure 7:
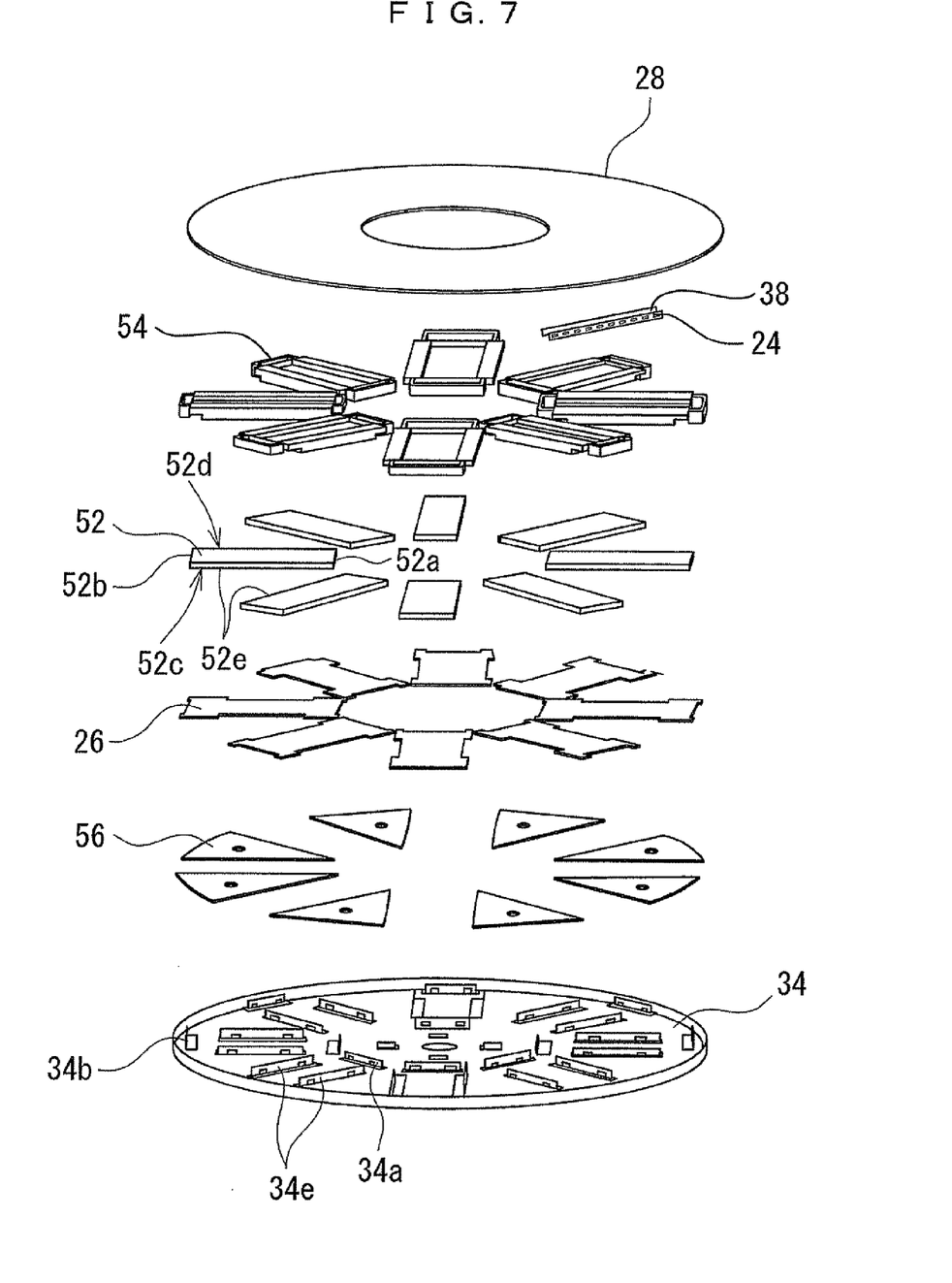
FIG. 7 is the exploded view of the illuminator illustrated in FIG. 6 where each of the composition parts thereof is illustrated.

An illuminator 50 according to the second embodiment of the present invention is, as shown in FIG. 7, formed as that a light guide plate 52 composing a light source unit 32 is formed to have a square configuration in a plan view. LEDs composing a plurality of point light sources 24 that are mounted on a circuit board 38 are arranged along each of lateral sides 52e facing the light source unit 32 next to each other. The above (the light guide plate 52, the point light sources 24 and the like) is all housed in a housing fame 54 (that is, a square frame in a plan view) so as to be integrally formed as shown in FIG. 6B. Each of the light source units 32, which is square in a plan view, is mounted to a base frame 34 through a reflective plate 26, which is also formed into square in a plan view.

On the base frame 34, as shown in FIG. 7, lug portions 34a, 34b, and 34e are formed so as to position the four sides of the housing frame 54 of the light source units 32. By means of these lug portions 34a, 34b, and 34e, in the example of FIG. 6B, 8 pairs of the light source units 32 are radially arranged at the center (or the reference point) of the base frame 34, which is circular in a plan view. Further, in the embodiment of the present invention, a reflective plate 56 (the same material with the reflective plate 26), which is a fan shape in a plan view, is arranged on a mute area, which is a fan shape in a plan view, the reflective plate 56 being arranged between each of the housing frames 54. See FIG. 6B.

In the illuminator 50 according to the second embodiment of the present invention, because of the square configuration in a plan view, each of the light guide plates 52 can be more simplified in its structure than the one of the light guide plate 36 disclosed in the first embodiment. Further, since each element by which the light source unit 32 is composed is integrally assembled by the housing frame 54, the light source unit 32 itself is allowed to easily remove from the base frame 34. In addition, each of the housing frames 54 has a simplified square configuration. Here, explanations for operational effects of the second embodiment identical with the first embodiment are omitted; however, it may easily understand that the features of the second embodiment are applicable to the first embodiment and vice versa.

What is claimed is:

1. An illuminator comprising:
a plurality of light source units that include:
   a light guide; plate that includes:
      an internal side positioned radially at a most inside position;
      an external side positioned radially at a most outside position; and
      a lateral side radially connecting the internal side and the external side; and
   a plurality of point light sources arranged on the lateral side of the light guide plate, each of the plurality of light source units being configured such that light introduced from the plurality of point light sources to the light guide plate is adapted to exit from a main surface of the light guide plate,
wherein the plurality of light source units are radially positioned at a reference point of a base frame.

2. The illuminator according to claim 1, wherein the light guide plate of each of the plurality of light source units is configured so that the external side of the light guide plate positioned farthest in a radial direction from the reference point of the base frame is made to have a wider width than the internal side of the light guide plate facing the reference point of the base frame.

3. The illuminator according to claim 1, wherein a space defined between each of the lateral sides of the light guide plates of adjacent light source units is made constant from the internal side of the light guide plate facing the reference point of the base frame to the external side of the light guide plate positioned farthest in a radial direction from the reference point of the base frame.

4. The illuminator according to claim 1, wherein the base frame has a circular configuration in a plan view, a center of the base frame is the reference point.

5. The illuminator according to claim 1, wherein the plurality of point light sources of each of the plurality of light source units are arranged along each of lug portions that is radially placed on the base frame.

6. The illuminator according to claim 5, wherein each of the lug portions is shaped to have a wall configuration, and
the plurality of point light sources of the plurality of light source units positioned adjacent to each other are arranged on two side surfaces of the lug portions.

7. The illuminator according to claim 1, wherein a frame member is arranged to cover between each of the lateral sides of the light guide plates of adjacent light source units,
the frame member projecting in a direction that light exits from the main surface of the light guide plate to form a projected surface, and
the projected surface of the frame member includes a pair of inclined surfaces that taper while moving away from the main surface of the light guide plate in the direction that light exits.

8. The illuminator according to claim 1, wherein an interval between each individual point light source in the plurality of point light sources is adapted to shorten when moving from each of the internal sides of the light guide plates facing the reference point of the base frame to each of the external sides of the light guide plates positioned farthest in a radial direction from the reference point of the base frame.

\* \* \* \* \*